United States Patent
Ota

(10) Patent No.: US 8,021,790 B2
(45) Date of Patent: Sep. 20, 2011

(54) BATTERY STRUCTURE AND LITHIUM SECONDARY BATTERY USING THE SAME

(75) Inventor: Nobuhiro Ota, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 639 days.

(21) Appl. No.: 12/282,149

(22) PCT Filed: Dec. 13, 2007

(86) PCT No.: PCT/JP2007/074002
§ 371 (c)(1),
(2), (4) Date: Sep. 8, 2008

(87) PCT Pub. No.: WO2008/072685
PCT Pub. Date: Jun. 19, 2008

(65) Prior Publication Data
US 2009/0029265 A1    Jan. 29, 2009

(30) Foreign Application Priority Data

Dec. 14, 2006 (JP) ................................. 2006-336484

(51) Int. Cl.
*H01M 6/18* (2006.01)
(52) U.S. Cl. ........................................................ 429/304
(58) Field of Classification Search ........................ None
See application file for complete search history.

(56) References Cited

U.S. PATENT DOCUMENTS

| | | | |
|---|---|---|---|
| 4,599,284 A | 7/1986 | Akridge | |
| 6,365,300 B1 | 4/2002 | Ota et al. | |
| 6,641,863 B2 | 11/2003 | Kugai et al. | |

FOREIGN PATENT DOCUMENTS

| | | |
|---|---|---|
| EP | 1217682 A2 | 6/2002 |
| EP | 1732152 A1 | 12/2006 |
| JP | 4-231346 | 8/1992 |
| JP | 6-54687 | 7/1994 |
| JP | 10-083838 | 3/1998 |
| JP | 3233345 | 9/2001 |
| JP | 2002-329524 | 11/2002 |
| JP | 2003-68361 | 3/2003 |
| JP | 2004-127743 | 4/2004 |
| JP | 2004-179158 | 6/2004 |
| JP | 2004-247317 | 9/2004 |
| JP | 2004-265685 | 9/2004 |
| JP | 3716833 | 9/2005 |
| JP | 2006-222063 | 8/2006 |

OTHER PUBLICATIONS

"Ionically Conductive Sulfide-Based Lithium Glasses" as published in the Journal of Non-Crystalline Solids 123 (1990) 0022-3093/90/ $03.50—Elsevier Science Publishers B.V.North Holland pp. 328 through 338.
esp@cenet patent abstract JP2006222063 dated Aug. 24, 2006 (1 page).
esp@cenet patent abstract JP2002329524 dated Nov. 15, 2002 (1 page).
esp@cenet patent abstract JP2004247317 dated Sep. 2, 2004 (1 page).
Patent Abstracts of Japan 2004-179158 dated Jun. 24, 2004 (1 page).
Patent Abstracts of Japan 2004-127743 dated Apr. 22, 2004 (1 page).
Patent Abstracts of Japan 04-231346 dated Aug. 20, 1992 (1 page).
Patent Abstracts of Japan 11-134937 dated May 21, 1999 (1 page) (Related to Foreign Reference 7 Above).
Patent Abstracts of Japan 2004-265685 dated Sep. 24, 2004 (1 page).
Patent Abstracts of Japan 10-083838 dated Mar. 31, 1988 (1 page).
Patent Abstracts of Japan 2003-068361 dated Mar. 7, 2003 (1 page).
Patent Abstracts of Japan 2004-220906 dated Aug. 5, 2004 (1 page) (Related to Foreign Reference 11 Above).
International Search Report (English only) for PCT/JP2007/074002 mailed Mar. 11, 2008 (2 pages).
Supplementary European Search Report in Application No. 07850523.7-1227, dated Oct. 1, 2010 (4 pages).

*Primary Examiner* — Cynthia Lee

(74) *Attorney, Agent, or Firm* — Osha • Liang LLP

(57) ABSTRACT

A battery structure includes a positive electrode layer, a solid electrolyte layer, and a negative electrode layer disposed in that order, wherein the solid electrolyte layer has a chemical composition, excluding incidental impurities, represented by the formula $aLi \cdot bX \cdot cS \cdot dY$, where X is at least one element of phosphorus (P) and boron (B), Y is at least one element of oxygen (O) and nitrogen (N), the sum of a, b, c, and d is 1, a is 0.20 to 0.52, b is 0.10 to 0.20, c is 0.30 to 0.55, and d is 0 to 0.30. The solid electrolyte layer includes a portion A in contact with the negative electrode layer and a portion B in contact with the positive electrode layer, and d in the portion A is larger than d in the portion B. A lithium secondary battery includes the battery structure.

12 Claims, No Drawings

BATTERY STRUCTURE AND LITHIUM SECONDARY BATTERY USING THE SAME

TECHNICAL FIELD

The present invention relates to a battery structure having a high capacity and excellent charge/discharge characteristics, and a lithium secondary battery using the same.

BACKGROUND ART

Examples of lithium secondary batteries include batteries using an organic electrolyte (electrolyte in the form of a solution of an organic substance, hereinafter also referred to as an "organic electrolytic solution") and batteries using a solid electrolyte (hereinafter also referred to as a "solid electrolyte layer"). Above all, batteries in which a lithium (Li) based metal is used for a negative electrode (hereinafter also referred to as a "negative electrode layer") have a high discharge capacity per unit volume and thus are considered to be excellent. However, in the former, if metallic Li is used for a negative electrode, as charging and discharging are repeated, the metallic Li may react with the organic electrolytic solution to form needle crystals, resulting in a decrease in charge/discharge cycling characteristics, and furthermore the needle crystals may penetrate a separator and reach a positive electrode (hereinafter also referred to as a "positive electrode layer"), thus causing short circuiting. In order to prevent such a problem, various means have been employed, for example, use of a composite material in which carbon and a Li metal foil are laminated together, use of Wood's metal, and alloying. Furthermore, in many cases, the batteries using the organic electrolytic solution cannot withstand the temperature in the reflow solder mounting process, and thus heat resistance is insufficient. On the other hand, in the latter using the solid electrolyte, although heat resistance is sufficient in the reflow solder mounting process, means for improving the heat resistance of Li having a melting point of about 180° C. is required. Various measures have been taken for this purpose. For example, Japanese Unexamined Patent Application Publication No. 2004-179158 (Patent Reference 1) and Japanese Unexamined Patent Application Publication No. 2004-127743 (Patent Reference 2) introduce negative electrode materials, such as a composite material in which metallic Li or particles thereof are embedded in a carbon-based material.

Lithium secondary batteries having a basic construction in which a solid electrolyte layer is disposed between a positive electrode layer composed of $LiCoO_2$ or the like and a negative electrode layer containing Li have been mainly produced by a method in which these components are deposited from a vapor phase (hereinafter also referred to as a "vapor-phase synthesis method") or by a method in which powder molding is carried out (hereinafter also referred to as a "powder method"). Furthermore, as introduced in the above-mentioned Patent Reference 2 and Journal of Non-Crystalline Solids, 123 (1990) pp. 328-338 (Non-Patent Reference 1), examples of the material for the solid electrolyte layer include Li compounds mainly containing phosphorus (P) and sulfur (S) and compounds obtained by further incorporating oxygen (O) into these compounds. As introduced in the above Patent Reference 1, examples also include Li compounds containing niobium (Nb), tantalum (Ta), and oxygen (O).

In the case of the powder method, starting material powders have been formed mainly by a technique of quenching and solidifying a melt (melt-quenching or another quenching technique) or by a mechanical milling (MM) technique in which powders are allowed to react with each other by mixing using a ball mill or the like. These powders are glassy and/or crystalline and in the form of disks, lumps, or flakes. The former is introduced in, for example, the above-mentioned Non-Patent Reference 1 and Japanese Unexamined Patent Application Publication No. 4-231346 (Patent Reference 3), and the latter is introduced in, for example, Japanese Patent No. 3233345 (Patent Reference 4) and Japanese Unexamined Patent Application Publication No. 2004-265685 (Patent Reference 5).

Examples of the secondary batteries containing a solid electrolyte include a structure in which battery components including a positive electrode layer, a solid electrolyte layer, and a negative electrode layer, each in a thin film form, are deposited by the vapor-phase synthesis method, a structure in which the battery components are deposited on a metal thin film disposed on a ceramic base or on a current collector layer composed of a metal foil, and a structure in which powder compacts are used for a positive electrode layer and a solid electrolyte layer, and the battery components, each in a thick film form, are disposed.

Representative examples of the solid electrolyte include an electrolyte composed of LiPON obtained by nitriding of lithium phosphate and an electrolyte composed of an amorphous $Li_2O$—$V_2O_5$—$SiO_2$-based oxide. Incidentally, Japanese Unexamined Patent Application Publication No. 10-83838 (Patent Reference 6) introduces the latter material with improved charge/discharge cycling characteristics. In secondary batteries in which these materials are used for solid electrolytes, in the case of a battery of a thin film type, the Li ionic conductivity is about $10^{-6}$ S/cm, the current density is about 10 $\mu A/cm^2$, and the capacity is about several tens of microampere hours ($\mu Ah$) at the most. Consequently, the value is considerably lower than about 3 $mAh/cm^2$ of ordinary secondary batteries using an organic electrolytic solution, and high-speed charging is difficult. Thus, they are not of a practical level.

Under these circumstances, in order to improve the current density, attempts have been made in which sulfide-based solid electrolytes, such as $Li_2S$—$P_2S_5$-based solid electrolytes, having high Li ionic conductivity comparable to that of the organic electrolytic solutions are used. However, the sulfide-based solid electrolytes are electrochemically unstable against a negative electrode containing metallic Li and easily decompose. Incidentally, solid electrolytes containing sulfur (S) and phosphorus (P) having relatively high lithium ionic conductivity are introduced in, for example, Japanese Unexamined Patent Application Publication No. 2003-68361 (Patent Reference 7), in which, however, carbon is used as a negative electrode. Meanwhile, Japanese Unexamined Patent Application Publication No. 4-231346 (Patent Reference 3) and Japanese Examined Patent Application Publication No. 6-54687 (Patent Reference 8) show lithium secondary batteries having a negative electrode composed of metallic Li in which a solid electrolyte material containing oxygen (O) and a halogen (Cl, I, or the like) in addition to sulfur (S) and phosphorus (P) is used. However, it is known that the potential window is relatively narrowed by the addition of LiI or the like. Furthermore, Japanese Patent No 3716833 (Patent Reference 9) discloses a battery in which a negative electrode is composed of a solid electrolyte material containing oxygen (O) in addition to sulfur (S) and phosphorus (P), which has a relatively high capacity and in which charge/discharge cycling characteristics are improved.

[Patent Reference 1] Japanese Unexamined Patent Application Publication No. 2004-179158

[Patent Reference 2] Japanese Unexamined Patent Application Publication No. 2004-127743

[Patent Reference 3] Japanese Unexamined Patent Application Publication No. 4-231346

[Patent Reference 4] Japanese Patent No. 3233345

[Patent Reference 5] Japanese Unexamined Patent Application Publication No. 2004-265685

[Patent Reference 6] Japanese Unexamined Patent Application Publication No. 10-83838

[Patent Reference 7] Japanese Unexamined Patent Application Publication No. 2003-68361

[Patent Reference 8] Japanese Examined Patent Application Publication No. 6-54687

[Patent Reference 9] Japanese Patent No. 3716833

[Non-Patent Reference 1] Journal of Non-Crystalline Solids, 123 (1990) pp. 328-338

DISCLOSURE OF INVENTION

Problems to be Solved by the Invention

As described above, there has been a demand for a secondary battery including a negative electrode layer containing metallic Li and a sulfide-based solid electrolyte layer, which has a higher capacity and which is more electrochemically stable with respect to repeated charging and discharging. It is an object of the present invention to provide a battery structure for obtaining a solid electrolyte battery which has a high capacity and excellent charge/discharge characteristics (high current density and stable charge/discharge cycling characteristics even at low temperatures).

Means for Solving the Problems

As first means for solving the problems, the present invention provides a battery structure including a positive electrode layer, a solid electrolyte layer, and a negative electrode layer disposed in that order, wherein the solid electrolyte layer has a chemical composition, excluding incidental impurities, represented by the formula aLi·bX·cS·dY, where X is at least one element of phosphorus (P) and boron (B), Y is at least one element of oxygen (O) and nitrogen (N), the sum of a, b, c, and d is 1, a is 0.20 to 0.52, b is 0.10 to 0.20, c is 0.30 to 0.55, and d is 0 to 0.30. The solid electrolyte layer includes a portion A in contact with the negative electrode layer and a portion B in contact with the positive electrode layer, and d in the portion A is larger than d in the portion B.

Furthermore, as second means, the present invention provides a battery structure including a solid electrolyte layer which has the same chemical composition as the first means and which includes, in addition to the portion A and the portion B, a portion C that is not in contact with either of the positive and negative electrodes. However, in this case, the relationship between d in the portion A and d in the portion B can be left out of consideration, and d in each of the portion A and the portion B is larger than d in the portion C.

In each of the first and second means, preferably, d is in a range of 0.03 to 0.30 in the portion A and in a range of 0 to 0.25 in the portion B. Furthermore, in each of the first and second means, d may have a functional gradient in each of the portions and/or between the portions.

Moreover, the present invention also includes a lithium secondary battery including any one of the battery structures described above.

Furthermore, a method for fabricating a battery structure according to the present invention is as follows: First, raw materials for a positive electrode layer, a solid electrolyte layer, and a negative electrode layer are selected, and as necessary, these raw materials are subjected to a preparation step for preparing the composition and structure, such as mixing and heat treatment. Subsequently, preparation is performed by a method in which the raw materials or the sources for battery components subjected to the preparation step are formed into a predetermined shape (powder method), a method in which the source components are deposited by sputtering, vapor deposition, or the like on a predetermined base, such as a current collector (vapor-phase synthesis method), or by a method in which these methods are combined appropriately. In any case, various means may be used depending on the specifications of the battery structure.

ADVANTAGES

The present invention can provide a battery structure for obtaining a solid electrolyte battery which has high capacity and excellent charge/discharge characteristics high current density and stable charge/discharge cycling characteristics even at low temperatures) and a lithium secondary battery using the same.

BEST MODES FOR CARRYING OUT THE INVENTION

An example of a battery structure according to the present invention will be described below. The present invention provides a battery structure including a positive electrode layer, a solid electrolyte layer, a negative electrode layer disposed in that order, wherein the solid electrolyte layer includes a portion in contact with the negative electrode layer and a portion in contact with the positive electrode layer, these portions having controlled amounts of oxygen element (hereinafter may be simply expressed as "O") and nitrogen element (hereinafter may be simply expressed as "N"). The solid electrolyte layer of the structure of the present invention has a chemical composition, excluding incidental impurities, represented by the formula aLi·bX·cS·dY, where Li is a lithium element, X is at least one element of phosphorus (P) and boron (B), and Y is at least one element of oxygen (O) and nitrogen (N). Furthermore, a, b, c, and d represent atomic fractions in the composition, and the sum thereof is 1 (a+b+c+d=1), a, b, c, and d representing contents of the respective elements provided that the total of the elements in the composition is 1. Furthermore, a is 0.20 to 0.52, b is 0.10 to 0.20, c is 0.30 to 0.55, and d is 0 to 0.30. The solid electrolyte layer of the structure of the present invention having the composition described above includes at least a portion A in contact with the negative electrode layer and a portion B in contact with the positive electrode layer.

In the first means of the present invention, the solid electrolyte layer includes the portion A and the portion B, and d in the portion A is larger than d in the portion B. Preferably d is in a range of 0.03 to 0.30 in the portion A and in a range of 0 to 0.25 in the portion B. Furthermore, in the second means of the present invention, the solid electrolyte layer includes, in addition to the portions A and B, a portion C that is not in contact with either of the positive and negative electrodes. In this case, the relationship between d in the portion A and d in the portion B can be left out of consideration, and d in each of the portion A and the portion B is larger than d in the portion C. That is, in the second means, there may be cases where $d_A > d_B > d_C$, $d_A = d_B > d_C$, and $d_B > d_A > d_C$, where $d_A$ represents d in the portion A, $d_B$ represents d in the portion B, and dc represents d in the portion C.

The basic composition of the solid electrolyte layer is a Li—P—S-based system, a Li—B—S-based system, or a component system in which both of these systems form a solid solution. By setting the atomic fractions a, b, c, and d of the constitutional elements in the ranges described above, it is possible to obtain a battery structure having a lithium (Li) ionic conductivity of $1 \times 10^{-4}$ S/cm or more and a lithium (Li) ionic transport number of 0.9999999 or more. In particular, when d is in a range of 0 to 0.05, it is possible to obtain a battery structure having a lithium (Li) ionic conductivity of $1 \times 10^{-3}$ S/cm or more and a lithium (Li) ionic transport number of 0.99999 or more.

In the battery structure (hereinafter may be simply referred to as "structure") of the present invention, regardless of the presence or absence of the portion C, by employing the construction described above, the Li ionic conductivity of the entire solid electrolyte layer decreases. However, since the portion A becomes electrochemically stable against the active Li-based metal of the negative electrode layer in direct contact with the portion A and the portion B also becomes electrochemically stable against the active material of the positive electrode layer, the rate of degradation of the solid electrolyte layer due to repeated charge/discharge cycles is reduced. Consequently, an increase in polarization in the solid electrolyte layer can be suppressed, and a decrease in the charge/discharge capacity can be suppressed.

In the first means, when the solid electrolyte layer has a two-layered structure in which the portions A and B are disposed, the thickness of the portion A is preferably in a range of 0.01% to 10% of the thickness of the solid electrolyte layer. In such a case, if lower than the lower limit, the covering effect on the surface of the negative electrode becomes insufficient, and the effect tends to be hardly exhibited. On the other hand, if exceeding the upper limit, the Li ionic conductivity of the solid electrolyte layer decreases, and the capacity of the battery easily decreases when the current density is increased. Furthermore, in the second means, when the solid electrolyte layer has a three-layered structure in which the portion A and the portion B are disposed with the portion C therebetween, the thickness of each of the portions A and B is preferably in a range of 0.01% to 1% of the thickness of the solid electrolyte layer, and in particular, in a thin-film solid electrolyte layer, preferably in a range of 0.1% to 10% of the thickness of the layer. In such a case, if lower than the lower limit, the effect tends to become insufficient. If exceeding the upper limit, the Li ionic conductivity of the solid electrolyte layer easily decreases, and there is a possibility that the capacity of the battery may not be sufficiently secured.

In order to secure the capacity of the battery, preferably, d is as small as possible to such an extent that the electrochemical stability of the solid electrolyte layer can be sufficiently secured. The reason for this is that, as described above, the Li ionic conductivity of the solid electrolyte layer varies depending on the value d, thus affecting the charging rate and the discharge capacity of the battery. Consequently, as described above, preferably, d is controlled in a range of 0.03 to 0.30 in the portion A on the negative electrode side and in a range of 0 to 0.25 in the portion B on the positive electrode side. More preferably, d is in a range of 0.07 to 0.20 in each of the portions A and B. When the portion C is present, d in the portion C is preferably in a range of 0 to 0.05, and is most preferably 0.

In the solid electrolyte layer of the structure of the present invention, according to each of the first and second means, the portion A must be at least partially in contact with the negative electrode layer, and the portion B must be at least partially in contact with the positive electrode layer. It is not always necessary that the entire surface of the portion A or the portion B is in contact with the negative electrode layer or the positive electrode layer. This may be changed, for example, according to the design of the positive and negative electrodes.

Each portion of the solid electrolyte of the structure of the present invention may include a plurality of types of compositions as long as the range of the composition described above is satisfied. For example, depending on the specifications of the battery structure, each of the portions A and B may have the same chemical composition over the entire surface, or may include a group of small portions with different chemical compositions. Furthermore, for example, a construction may be used in which a plurality of layers having different compositions are disposed. Furthermore, for example, a and b in each of the portions A, B, and C may be the same or different as long as the ranges described above are satisfied.

The ranges of d, preferred embodiments thereof, and the advantageous effects have been described above. In an example of the battery structure provided by the present invention, d has a functional gradient in each of the portions and/or between the portions. For example, when the portions are disposed in the thickness direction, d may change substantially continuously at intervals of several tens of nanometers or less, or may change stepwise in a range of several micrometers to several tens of micrometers. There may also be a case where d changes at intervals in between the above two. Consequently, the gradient $\Delta d/\Delta t$ of d (amount of change $\Delta d$ of d per unit thickness $\Delta t$) may be entirely or partially freely controlled over the entire solid electrolyte layer. For example, in a cross section of a structure in which the portions A, B, and C are simply disposed in that order in the thickness direction, the control range may be the entire region from the contact interface between the portion A and the negative electrode to the contact interface between the portion B and the positive electrode, or may be only the inside of each portion. Although depending on the materials and shapes of the positive and negative electrode layers and the structure of the solid electrolyte layer, by using such a functional gradient structure, the electrochemical stability of the solid electrolyte layer can be further increased, or the decrease in the battery capacity can be further reduced.

An example of a method for fabricating a battery structure of the present invention, in particular, a battery structure including battery components, each in a thin film form, will be described below. The battery structure is usually formed by a process in which a positive electrode layer, a solid electrolyte layer in which the contents of O and N are partially controlled according to the present invention, and a metallic Li-based negative electrode layer are disposed in that order by a vapor-phase synthesis method on a current collector composed of a metal foil made of copper (Cu), nickel (Ni), iron (Fe), stainless steel (SUS), or the like, or a current collector in which a layer of any of these metals is formed on a surface of an electrically insulating base. In such a case, the individual battery components, i.e., the negative electrode layer, the solid electrolyte layer, and the positive electrode layer, may be formed in that order on the current collector. Alternatively, after the solid electrolyte layer is formed, the positive electrode layer and the negative electrode layer may be formed in parallel with the solid electrolyte layer therebetween. Furthermore, it may also be possible to use a method in which, without forming the metal layer for current collection on the electrically insulating base, the individual battery components, i.e., the solid electrolyte layer, the positive electrode layer, and the negative electrode layer, are formed in that order directly on the electrically insulating base, and then a current collector is formed for each battery component. Furthermore, in order to form the thin films of the current collector and the individual battery components, vapor deposition, sputtering, ion plating, laser ablation, or the like may be used. Furthermore, in order to form the positive electrode layer, a wet process, such as a sol-gel process, a colloid process, or a casting process, may be used.

As the material for the positive electrode layer, usually, for example, an oxide, such as lithium cobaltate (chemical formula $LiCoO_2$), lithium manganate (chemical formula $LiMn_2O_4$), or lithium iron phosphate (chemical formula $LiFePO_4$), is used. It may also be possible to use sulfur (S), lithium sulfide (chemical formula $Li_2S$), iron sulfide (chemical formula FeS or $FeS_2$) and titanium sulfide (chemical formula $TiS_2$). As the material for the negative electrode layer, metallic Li, aluminum (Al), silicon (Si), tin (Sn), bismuth (Bi), indium (In), a metal that forms an alloy with Li (e.g., an alkaline earth metal), a Li alloy, or metallic Li containing an element, such as B, C, P, S, or O, in advance, is used. When elemental metallic Li is used for the negative electrode layer, an irreversible capacitance phenomenon, in which the discharge capacity significantly decreases against the charge capacity at the initial charge/discharge cycle, occurs. However, if a Li alloy is used in advance, this can be avoided and the capacity density of the battery can be increased.

Next, an example of a method for fabricating a battery structure of the present invention, in particular, a battery structure including battery components, each in a thick film form, will be described. The battery structure is usually formed by disposing the positive electrode layer, the solid electrolyte layer, and the negative electrode layer in that order on the current collector in the same manner as described above. The positive electrode layer is usually a mixture of an active material, a solid electrolyte, and a conduction aid. The active material is, for example, composed of a material containing a transition metal element in the periodic table of the elements, and examples thereof include lithium cobaltate (chemical formula $LiCoO_2$), lithium manganate (chemical formula $LiMn_2O_4$), and lithium iron phosphate (chemical formula $LiFePO_4$). Examples of the material for the conduction aid include carbon materials, such as Ketjenblack, acetylene black, carbon fibers produced by a vapor-phase synthesis method, and graphite; and metals, such as nickel (Ni), copper (Cu), and stainless steel (SUS). As the material for the solid electrolyte, the solid electrolyte of the present invention described above may be used.

As the material for the solid electrolyte layer, the material having the chemical composition of the present invention in any of various forms, such as powders, lumps, and foils, is used. Examples of the phase morphology include glassy powders obtained by melting at high temperatures and subsequent quenching to near room temperature or by mechanical milling, powders obtained by subjecting the glassy powders to heat treatment and full or partial recrystallization, mixtures of these powders, and complex compounds of these powders. The lithium ionic conductivity of these solid electrolyte powders is preferably $1 \times 10^{-4}$ S/cm or more, and more preferably $1 \times 10^{-3}$ S/cm or more. Furthermore, examples of the material for the negative electrode layer include, in addition to carbon (C) and metallic Li, metal elements, such as Al, Si, and Sn, that form alloys with Li, and alloys of Li and these metals.

As the positive electrode layer, a material in any of various forms, such as powders, lumps, foils, and thin films with purity ensured is selected and subjected to press molding to form a dense layer. Next, a solid electrolyte layer having a desired shape, a high degree of adhesion, and high density is formed on the positive electrode layer by a press molding method using a solid electrolyte material having the chemical composition of the present invention or by a vapor-phase synthesis method using the same material as a source. Finally, a negative electrode layer having a desired shape, a high degree of adhesion, and high density is formed on the solid electrolyte layer by subjecting a negative electrode layer material to press molding or by a vapor-phase synthesis method using the same material as an evaporation source.

Furthermore, the present invention also covers a lithium secondary battery including any of the battery structures described above. The specific advantageous effects thereof will be described in Examples below. It is to be understood that the present invention is not limited to Examples below.

EXAMPLE 1

(Fabrication of Structure for Thin Battery by Vapor-Phase Synthesis Method and Evaluation)

A 100-mm square pure Al foil with a thickness of 100 μm was fixed on a base holder made of stainless steel, and masking was performed on the Al foil using stainless steel. The resulting assembly was placed in a vacuum chamber, and the surface thereof was cleaned with an Ar ion beam. Then, using a laser ablation method, in which, while heating the surface temperature of the base at 650° C., in a decreased pressure atmosphere of oxygen of $10^{-2}$ Pa, KrF excimer laser pulses were repeatedly applied at 10 Hz and at an energy density of 2 J/cm$^2$, an evaporation source was evaporated by heating and deposited over the entire surface of the base. Thereby, a positive electrode layer composed of $LiCoO_2$ with a thickness of 1 μm was formed. The thickness of the layer was determined by a stylus film-thickness meter using a layer formed on a Si substrate which was prepared in advance and provided in the vicinity of the base. Furthermore, when the battery was circular with an outer diameter of 16 mm, the capacity of the resulting positive electrode layer active material was 0.12 mAh.

The Al base provided with the positive electrode layer composed of $LiCoO_2$ was formed by punching into a circular shape with an outer diameter of 16 mm, and a stainless steel mask having a hole with an outer diameter of 15 mm was disposed thereon. Thereby, a positive electrode substrate was prepared. The substrate was fixed on a holder in an excimer laser ablation deposition apparatus, and then the evaporation source was evaporated by heating over the entire surface of the substrate by a laser ablation method, in which KrF excimer laser is repeatedly applied according to the procedure described below. A solid electrolyte layer with a total thickness of 1 μm basically having a two-layered structure including portions A and B or a three-layered structure including portions A, B, and C was formed. The formation procedure will be described below. The ionic conductivity of the solid electrolyte layer was determined by a complex impedance measurement method using a gold (Au) comb electrode formed on a glass substrate which was prepared in advance and provided in the vicinity of the base. Next, a stainless steel mask having a hole with an outer diameter of 14 mm was disposed on the solid electrolyte layer-formed surface. Then, the workpiece was fixed on a holder, and a negative electrode layer composed of metallic Li with a thickness of 1 μm was formed on the solid electrolyte layer by a vapor deposition method under a degree of vacuum of $10^{-4}$ Pa. Thereby, a battery structure sample was obtained. The thickness of the negative electrode layer was determined by inductively coupled plasma spectroscopy (ICP) using a layer formed on a stainless steel substrate which was prepared in advance and provided in the vicinity of the base.

Each of the resulting battery structure samples was incorporated into a coin-type battery container in a glove box in an atmosphere of Ar gas with a dew point of −80° C., and then the battery was taken out of the box. A charge/discharge cycling test was carried out while applying a constant current of 1.12 mA at 10 C, at a charge voltage of 4.3 V and a discharge voltage of 3 V, and the capacity density level maintained at the 1000th charge/discharge cycle was determined.

The formation procedure of the solid electrolyte layer will be described below. As starting materials, powders of lithium sulfide ($Li_2S$), phosphorus pentasulfide ($P_2S_5$), and boron sulfide ($B_2S_3$) were used. In a glove box filled with Ar gas with a dew point of −80° C., these types of starting material were classified into compositions corresponding to the types of element and the atomic fractions a and b shown in Table I and collected, followed by mixing. The resulting mixtures were molded into target materials in the form of pellets. These target materials were transferred to a laser ablation deposition apparatus so as not to be exposed to the air, and the positive electrode substrate masked with stainless steel was fixed on a holder in the same apparatus. Then, without heating the surface of the substrate, by allocating time to the layers A, B, and C according to the thickness, and by adjusting the partial pressure of oxygen and/or nitrogen gas in a range of 0 to $10^{-1}$ Pa on the basis of an Ar gas atmosphere at a total pressure of $10^{-1}$ Pa according to the content of oxygen and/or nitrogen in the solid electrolyte thin film, the target materials were evaporated by focusing of KrF excimer laser by a laser ablation method, in which KrF excimer laser pulses were repeatedly applied at 10 Hz and at an energy density of 2 $J/cm^2$. The solid electrolyte layer having the combination shown in Table I was formed over the entire surface of the substrate at a total thickness of 1 μm. After the solid electrolyte layer was formed, the substrate temperature was increased to 225° C. and heating was performed. An OCV (open-circuit voltage) of 3 V or more was observed before the charge/discharge test. Furthermore, when the sample was left to stand for 24 hours in a charged state, no decrease in voltage was observed, there was no short-circuiting between the positive electrode and the negative electrode, and it was confirmed that electron conductivity due to reductive decomposition of the solid electrolyte thin film did not appear.

TABLE I

Solid electrolyte layer of battery structure

| Sample number | X | Y | Negative electrode contact portion A | | | | Presence or absence of portion C and atomic fraction d | Positive electrode contact portion B | | | | Conductivity S/cm | Capacity density at 10 C. mAh/cm² |
|---|---|---|---|---|---|---|---|---|---|---|---|---|---|
| | | | a | b | c | d | | a | b | c | d | | |
| *1 | P | O | 0.17 | 0.21 | 0.61 | 0.01 | Absent | 0.18 | 0.21 | 0.61 | 0 | $1 \times 10^{-5}$ | <50 |
| 2 | P | O | 0.21 | 0.20 | 0.55 | 0.04 | Absent | 0.21 | 0.20 | 0.55 | 0.03 | $2 \times 10^{-4}$ | 100 |
| 3 | P | O | 0.27 | 0.17 | 0.49 | 0.07 | Absent | 0.27 | 0.17 | 0.51 | 0.05 | $2 \times 10^{-4}$ | 110 |
| 4 | P | O | 0.30 | 0.16 | 0.44 | 0.10 | Absent | 0.32 | 0.15 | 0.45 | 0.08 | $1 \times 10^{-3}$ | 120 |
| 5 | P | O | 0.40 | 0.12 | 0.31 | 0.17 | Absent | 0.41 | 0.11 | 0.33 | 0.15 | $8 \times 10^{-4}$ | 110 |
| 6 | P | O | 0.44 | 0.10 | 0.37 | 0.09 | Absent | 0.44 | 0.10 | 0.38 | 0.08 | $1 \times 10^{-3}$ | 120 |
| *7 | P | O | 0.48 | 0.08 | 0.34 | 0.10 | Absent | 0.48 | 0.08 | 0.35 | 0.09 | $1 \times 10^{-5}$ | <50 |
| *8 | B | O | 0.05 | 0.37 | 0.56 | 0.02 | Absent | 0.05 | 0.37 | 0.58 | 0 | $1 \times 10^{-7}$ | <50 |
| 9 | B | O | 0.38 | 0.17 | 0.41 | 0.04 | Absent | 0.38 | 0.17 | 0.42 | 0.03 | $1 \times 10^{-3}$ | 120 |
| 10 | B | O | 0.34 | 0.20 | 0.30 | 0.16 | Absent | 0.34 | 0.20 | 0.41 | 0.05 | $8 \times 10^{-4}$ | 110 |
| 11 | B | O | 0.48 | 0.11 | 0.32 | 0.09 | Absent | 0.48 | 0.11 | 0.33 | 0.08 | $2 \times 10^{-3}$ | 125 |
| *12 | B | O | 0.53 | 0.08 | 0.28 | 0.11 | Absent | 0.53 | 0.08 | 0.29 | 0.10 | $1 \times 10^{-5}$ | <50 |
| 13 | P | O | 0.31 | 0.15 | 0.45 | 0.07 | Absent | 0.30 | 0.16 | 0.53 | 0.02 | $1 \times 10^{-3}$ | 120 |
| | | N | | | | 0.02 | | | | | 0 | | |
| 14 | B | O | 0.48 | 0.11 | 0.31 | 0.08 | Absent | 0.48 | 0.11 | 0.39 | 0.02 | $1 \times 10^{-3}$ | 120 |
| | | N | | | | 0.02 | | | | | 0 | | |
| 15 | B | N | 0.48 | 0.11 | 0.32 | 0.09 | Absent | 0.48 | 0.11 | 0.39 | 0.02 | $1 \times 10^{-3}$ | 120 |
| *16 | P | O | 0.20 | 0.20 | 0.58 | 0.02 | Absent | 0.20 | 0.20 | 0.59 | 0.01 | $1 \times 10^{-6}$ | <50 |
| 17 | P | O | 0.20 | 0.20 | 0.54 | 0.06 | Absent | 0.20 | 0.20 | 0.55 | 0.05 | $2 \times 10^{-4}$ | 100 |
| 18 | P | O | 0.20 | 0.20 | 0.40 | 0.20 | Absent | 0.20 | 0.20 | 0.42 | 0.18 | $1 \times 10^{-4}$ | 95 |
| 19 | P | O | 0.20 | 0.20 | 0.30 | 0.30 | Absent | 0.20 | 0.20 | 0.32 | 0.28 | $1 \times 10^{-4}$ | 95 |
| *20 | P | O | 0.20 | 0.20 | 0.28 | 0.32 | Absent | 0.20 | 0.20 | 0.29 | 0.31 | $1 \times 10^{-6}$ | <50 |
| *21 | P | O | 0.26 | 0.15 | 0.55 | 0.04 | Entirely same chemical composition as left including d | | | | | $2 \times 10^{-3}$ | 125 |
| 22 | P | O | 0.31 | 0.15 | 0.45 | 0.09 | Absent 67 | 0.31 | 0.15 | 0.48 | 0.06 | $2 \times 10^{-3}$ | 125 |
| 23 | B | O | 0.31 | 0.21 | 0.39 | 0.09 | 60 | 0.31 | 0.21 | 0.42 | 0.06 | $2 \times 10^{-3}$ | 120 |
| 24 | B | O | 0.31 | 0.21 | 0.39 | 0.08 | Absent 60 | 0.31 | 0.21 | 0.44 | 0.04 | $2 \times 10^{-3}$ | 120 |
| | | N | | | | 0.01 | | | | | 0 | | |
| 25 | P | O | 0.15 | 0.18 | 0.43 | 0.08 | Absent 63 | 0.15 | 0.18 | 0.50 | 0.02 | $1 \times 10^{-3}$ | 110 |
| | B | N | 0.15 | | | 0.01 | | 0.15 | | | 0 | | |
| 26 | P | O | 0.23 | 0.19 | 0.55 | 0.03 | Present 0.02 | 0.21 | 0.20 | 0.54 | 0.04 | $2 \times 10^{-4}$ | 80 |
| 27 | P | O | 0.27 | 0.17 | 0.51 | 0.05 | Present 0.02 | 0.25 | 0.18 | 0.50 | 0.07 | $4 \times 10^{-4}$ | 85 |
| 28 | P | O | 0.32 | 0.15 | 0.45 | 0.08 | Present 0.02 | 0.30 | 0.16 | 0.44 | 0.10 | $3 \times 10^{-4}$ | 80 |
| 29 | P | O | 0.41 | 0.11 | 0.33 | 0.15 | Present 0.02 | 0.40 | 0.12 | 0.31 | 0.17 | $3 \times 10^{-4}$ | 80 |
| 30 | P | O | 0.46 | 0.09 | 0.36 | 0.08 | Present 0.02 | 0.45 | 0.09 | 0.36 | 0.10 | $1 \times 10^{-3}$ | 120 |
| 31 | P | O | 0.32 | 0.15 | 0.45 | 0.08 | Present 0.02 | 0.30 | 0.16 | 0.46 | 0.08 | $1 \times 10^{-3}$ | 120 |
| 32 | B | O | 0.33 | 0.20 | 0.44 | 0.03 | Present 0.02 | 0.33 | 0.20 | 0.43 | 0.04 | $1 \times 10^{-3}$ | 120 |
| 33 | B | O | 0.46 | 0.12 | 0.36 | 0.06 | Present 0.02 | 0.34 | 0.20 | 0.30 | 0.16 | $1 \times 10^{-3}$ | 120 |
| 34 | B | O | 0.50 | 0.10 | 0.31 | 0.09 | Present 0.02 | 0.50 | 0.10 | 0.31 | 0.09 | $1 \times 10^{-3}$ | 120 |
| 35 | P | O | 0.29 | 0.16 | 0.53 | 0.02 | Present 0.01 | 0.25 | 0.18 | 0.48 | 0.08 | $1 \times 10^{-4}$ | 75 |
| | | N | | | | 0 | | | | | 0.02 | | |
| *36 | P | O | 0.17 | 0.21 | 0.60 | 0.02 | Present 0 | 0.18 | 0.21 | 0.60 | 0.01 | $1 \times 10^{-5}$ | <50 |
| 37 | P | O | 0.21 | 0.20 | 0.55 | 0.04 | Present 0.02 | 0.21 | 0.20 | 0.56 | 0.03 | $1 \times 10^{-4}$ | 75 |
| 38 | P | O | 0.25 | 0.18 | 0.50 | 0.07 | Present 0.02 | 0.26 | 0.17 | 0.51 | 0.05 | $2 \times 10^{-4}$ | 80 |
| 39 | P | O | 0.30 | 0.16 | 0.44 | 0.10 | Present 0.02 | 0.32 | 0.15 | 0.45 | 0.08 | $8 \times 10^{-4}$ | 95 |

TABLE I-continued

Solid electrolyte layer of battery structure

| Sample number | X | Y | Negative electrode contact portion A | | | | Presence or absence of portion C and atomic fraction d | | Positive electrode contact portion B | | | | Conductivity S/cm | Capacity density at 10 C. mAh/cm² |
|---|---|---|---|---|---|---|---|---|---|---|---|---|---|---|
| | | | a | b | c | d | | | a | b | c | d | | |
| 40 | P | O | 0.39 | 0.12 | 0.32 | 0.17 | Present | 0.02 | 0.41 | 0.11 | 0.33 | 0.15 | $7 \times 10^{-4}$ | 90 |
| 41 | P | O | 0.46 | 0.09 | 0.35 | 0.10 | Present | 0.02 | 0.46 | 0.09 | 0.37 | 0.08 | $1 \times 10^{-3}$ | 110 |
| *42 | P | O | 0.62 | 0.02 | 0.27 | 0.09 | Present | 0.02 | 0.62 | 0.02 | 0.26 | 0.10 | $1 \times 10^{-5}$ | <50 |
| *43 | B | O | 0.17 | 0.21 | 0.60 | 0.02 | Present | 0 | 0.18 | 0.21 | 0.60 | 0.01 | $1 \times 10^{-5}$ | <50 |
| 44 | B | O | 0.21 | 0.20 | 0.55 | 0.04 | Present | 0.02 | 0.21 | 0.19 | 0.56 | 0.03 | $1 \times 10^{-4}$ | 75 |
| 45 | B | O | 0.26 | 0.18 | 0.38 | 0.18 | Present | 0.02 | 0.41 | 0.11 | 0.43 | 0.05 | $4 \times 10^{-4}$ | 85 |
| 46 | B | O | 0.44 | 0.10 | 0.37 | 0.09 | | | 0.44 | 0.10 | 0.38 | 0.08 | $1 \times 10^{-3}$ | 100 |
| *47 | B | O | 0.57 | 0.04 | 0.28 | 0.11 | | | 0.57 | 0.04 | 0.29 | 0.10 | $3 \times 10^{-5}$ | <50 |
| 48 | P | O | 0.31 | 0.15 | 0.45 | 0.07 | Present | 0.02 | 0.31 | 0.15 | 0.52 | 0.02 | $1 \times 10^{-3}$ | 110 |
| | | N | | | | 0.02 | | | | | | 0 | | |
| 49 | B | O | 0.36 | 0.18 | 0.36 | 0.08 | Present | 0.02 | 0.36 | 0.18 | 0.44 | 0.02 | $1 \times 10^{-3}$ | 115 |
| | | N | | | | 0.02 | | | | | | 0 | | |
| 50 | B | N | 0.36 | 0.18 | 0.36 | 0.10 | Present | 0.02 | 0.36 | 0.18 | 0.44 | 0.02 | $1 \times 10^{-3}$ | 110 |
| *51 | P | O | 0.31 | 0.15 | 0.52 | 0.02 | Present | 0 | 0.34 | 0.14 | 0.51 | 0.01 | $2 \times 10^{-3}$ | 120 |
| 52 | P | O | 0.31 | 0.15 | 0.48 | 0.06 | Present | 0.02 | 0.34 | 0.14 | 0.47 | 0.05 | $1 \times 10^{-3}$ | 110 |
| 53 | P | O | 0.31 | 0.15 | 0.34 | 0.20 | Present | 0.02 | 0.34 | 0.14 | 0.34 | 0.18 | $5 \times 10^{-4}$ | 85 |
| 54 | P | O | 0.31 | 0.15 | 0.22 | 0.30 | Present | 0.02 | 0.34 | 0.14 | 0.24 | 0.28 | $1 \times 10^{-3}$ | 110 |
| *55 | P | O | 0.31 | 0.15 | 0.22 | 0.32 | Present | 0.02 | 0.34 | 0.14 | 0.20 | 0.31 | $1 \times 10^{-5}$ | <50 |
| *56 | B | O | 0.36 | 0.18 | 0.44 | 0.02 | Present | 0 | 0.37 | 0.18 | 0.44 | 0.01 | $1 \times 10^{-3}$ | 105 |
| 57 | B | O | 0.36 | 0.18 | 0.40 | 0.06 | Present | 0.02 | 0.37 | 0.18 | 0.40 | 0.05 | $8 \times 10^{-4}$ | 95 |
| 58 | B | O | 0.36 | 0.18 | 0.26 | 0.20 | Present | 0.02 | 0.37 | 0.18 | 0.27 | 0.18 | $5 \times 10^{-4}$ | 80 |
| 59 | B | O | 0.36 | 0.18 | 0.16 | 0.30 | Present | 0.02 | 0.37 | 0.18 | 0.17 | 0.28 | $3 \times 10^{-4}$ | 75 |
| *60 | B | O | 0.36 | 0.18 | 0.14 | 0.32 | Present | 0.02 | 0.37 | 0.18 | 0.14 | 0.31 | $3 \times 10^{-4}$ | <50 |
| 61 | P | O | 0.31 | 0.15 | 0.44 | 0.10 | Absent | | 0.31 | 0.15 | 0.48 | 0.06 | $2 \times 10^{-3}$ | 110 |
| | B | O | 0.31 | 0.15 | 0.44 | 0.10 | | | 0.31 | 0.15 | 0.48 | 0.06 | | |
| 62 | B | O | 0.36 | 0.18 | 0.36 | 0.08 | Absent | | 0.36 | 0.18 | 0.42 | 0.04 | $1 \times 10^{-3}$ | 110 |
| | | N | | | | 0.02 | | | | | | 0 | | |
| 63 | P | O | 0.16 | 0.18 | 0.42 | 0.08 | Absent | | 0.16 | 0.18 | 0.50 | 0.02 | $1 \times 10^{-3}$ | 115 |
| | B | N | 0.14 | | | 0.02 | | | 0.14 | | | 0 | | |
| 64 | P | O | 0.31 | 0.15 | 0.44 | 0.10 | Present | 0 | 0.31 | 0.15 | 0.35 | 0.19 | $5 \times 10^{-4}$ | 90 |
| 65 | P | O | 0.31 | 0.15 | 0.44 | 0.10 | Present | 0.05 | 0.31 | 0.15 | 0.35 | 0.19 | $5 \times 10^{-4}$ | 90 |
| 66 | P | O | 0.31 | 0.15 | 0.44 | 0.10 | Present | 0.07 | 0.31 | 0.15 | 0.35 | 0.19 | $5 \times 10^{-4}$ | 90 |
| 67 | B | O | 0.36 | 0.18 | 0.36 | 0.10 | Present | 0 | 0.36 | 0.18 | 0.27 | 0.19 | $5 \times 10^{-4}$ | 90 |
| 68 | B | O | 0.36 | 0.18 | 0.36 | 0.10 | Present | 0.05 | 0.36 | 0.18 | 0.27 | 0.19 | $5 \times 10^{-4}$ | 90 |
| 69 | B | O | 0.36 | 0.18 | 0.36 | 0.10 | Present | 0.07 | 0.36 | 0.18 | 0.27 | 0.19 | $5 \times 10^{-4}$ | 90 |

*Comparative Example

The content of Table I will now be described. All the samples have the same structures of the negative electrode layer and the positive electrode layer, which are not shown in the table. The "solid electrolyte layer of battery structure" column shows the chemical composition of the solid electrolyte layer on the basis of the chemical formula aLi·bX·cS·dY. X and Y in the same column represent the constituent element types for X and Y, respectively, and atomic fractions a, b, c, and d for each of the negative electrode contact portion A and the positive electrode contact portion B are shown. Although not shown in Table I, the thickness of the individual portions will be described later. The "Presence or absence of portion C and atomic fraction d" column shows the presence or absence of the portion C and the atomic fraction d in the same portion. Samples 64 to 69 in Table I show the cases in which the portion C is disposed, and d in the portion C is varied. The conductivity corresponds to the Li ionic conductivity of the formed solid electrolyte layer measured according to the procedure described later. The "Capacity density at 10 C" column shows determination results of cycling characteristics of the coin-type secondary batteries fabricated from the respective battery structures.

As described above, the total thickness of the solid electrolyte layer is 1 µm. The thickness of the portions A, B, and C and the atomic fractions in each sample are as follows: In Samples 1 to 20 and Samples 26 to 60, the former has a two-layered structure including the portions A and B, the latter has a three-layered structure including the portions A to C, and in each sample, the thickness of the portion A is 0.05 µm (5% of the total thickness of the solid electrolyte) and the thickness of the portion B is 0.95 µm. The atomic fractions in each sample are as shown in Table I. In the case of Sample 21, the entire solid electrolyte has the atomic fractions shown in Table 1. In the case of Samples 22 to 25 and Samples 61 to 63, the thickness of the portions A and B having the atomic fractions shown in the table is 0.05 µm (5% of the total thickness of the solid electrolyte), and in a range with a thickness of 0.9 µm therebetween, each of c and d has a functional gradient at intervals of 0.05 µm in thickness between the portions A and B. The thickness of the individual portions or the layers in each portion was determined by a stylus film-thickness meter in a dry room with a dew point of −60° C. or less, using a layer formed on a Si substrate which was prepared in advance and provided in the vicinity of the base as described above. Furthermore, the chemical composition of the individual portions was determined by subjecting the test pieces to composition analysis in the depth direction using an ESCA (ESCA5400MC manufactured by Ulvac-Phi, Inc).

EXAMPLE 2

(Fabrication of Structure for Battery Partially by Powder Method and Evaluation)

TABLE II

| Solid electrolyte | | Conduction aid | | Active material | |
|---|---|---|---|---|---|
| Material | Amount (mass %) | Material | Amount (mass %) | Material | Amount (mass %) |
| $Li_2S-P_2S_5$ | 47.6 | Acetylene black | 4.8 | $LiCoO_2$ | 47.6 |

In a glove box filled with Ar gas with a dew point of −90° C., a positive electrode active material, a solid electrolyte, and acetylene black powder in the combination and the ratio shown in Table II were placed in a planetary ball mill made of alumina and each was mixed under stirring for one hour. The mixed powder was filled in a mold made of carbide with a diameter of 15 mm with a built-in heating source, and performing was performed at a temperature of 150° C. and a pressure of 1,000 MPa. The composition shown in Table III in which the oxygen content was adjusted separately, and mixed powders constituting portions (mixed powder having the same component types as Samples Nos. 2, 8, 12, 17, and 18 in Example 1 as shown in the right end column in Table III, mixed powder constituting portions), in the order of the powder for the portion B and the powder for the portion A, were filled thereon, and pressing was performed again at a temperature of 150° C. and a pressure of 1,000 MPa. Thereby, a molded body in which the positive electrode layer, the portion B of the solid electrolyte, and the portion A of the solid electrolyte were disposed and integrated was obtained. The oxygen content in each of the starting material powders for the solid electrolyte layer was adjusted in advance by treatment under an oxygen partial pressure in a vacuum chamber. Furthermore, the amount of powder to be filled in the mold for each layer was adjusted in advance according to the molding conditions. In all the samples, the thickness of each of the positive electrode layer and the solid electrolyte layer after molding was set at 1 mm. In each of the resulting molded bodies, the apparent density (the value obtained by dividing the mass by the volume calculated from the outer dimensions) was 97% or more of the theoretical density (the value calculated from the theoretical densities of the constituent components and the volumetric ratio). Furthermore, a negative electrode layer composed of metallic Li with a thickness of 1 μm was formed by vapor deposition on the solid electrolyte layer by the same procedure as that in Example 1. Thereby, battery structure samples were obtained.

The ionic conductivity of the solid electrolyte layer was determined by a procedure in which a gold comb electrode was formed on a solid electrolyte thin film formed on a glass base and the ionic conductivity was measured by the complex impedance measurement method in the film surface direction. Each of these battery structure samples was incorporated into a coin-type battery container as in Example 1, and then the battery was taken out of the box. A charge/discharge cycling test was carried out while applying a constant current of 1.12 mA at 10 C, at a charge voltage of 4.3 V and a discharge voltage of 3 V, and the capacity density level maintained at the 1000th charge/discharge cycle was determined. The results thereof are shown in Table III.

TABLE III

| Sample number | Solid electrolyte layer of battery structure | | | | | | | | | | | Conductivity S/cm | Capacity density at 10 C. mAh/cm$^2$ | Sample number of corresponding structure |
|---|---|---|---|---|---|---|---|---|---|---|---|---|---|---|
| | | | Negative electrode contact portion A | | | | Intervening portion | Positive electrode contact portion B | | | | | | |
| | X | Y | a | b | c | d | | a | b | c | d | | | |
| *70 | B | O | 0.21 | 0.20 | 0.57 | 0.02 | Absent | 0.22 | 0.19 | 0.58 | 0.01 | $<10^{-5}$ | <50 | *2 |
| 71 | B | O | 0.26 | 0.13 | 0.51 | 0.10 | Absent | 0.28 | 0.15 | 0.55 | 0.02 | $1 \times 10^{-3}$ | 120 | 12 |
| 72 | B | O | 0.32 | 0.17 | 0.45 | 0.06 | Absent | 0.32 | 0.17 | 0.49 | 0.02 | $1 \times 10^{-3}$ | 110 | 17 |
| 73 | B | O | 0.51 | 0.10 | 0.32 | 0.07 | Absent | 0.51 | 0.10 | 0.36 | 0.03 | $1 \times 10^{-3}$ | 105 | 18 |
| *74 | B | O | 0.53 | 0.09 | 0.29 | 0.09 | Absent | 0.54 | 0.07 | 0.32 | 0.07 | $<10^{-5}$ | <50 | *8 |

*Comparative Example

INDUSTRIAL APPLICABILITY

The present invention can provide a battery structure for obtaining a solid electrolyte battery which has a high capacity and excellent charge/discharge characteristics, and a lithium secondary battery using the same.

The invention claimed is:

1. A battery structure comprising a positive electrode layer, a solid electrolyte layer, and a negative electrode layer disposed in that order, wherein the solid electrolyte layer has a chemical composition, excluding incidental impurities, represented by the formula $aLi \cdot bX \cdot cS \cdot dY$, where X is at least one element of phosphorus (P) and boron (B), Y is at least one element of oxygen (O) and nitrogen (N), the sum of a, b, c, and d is 1, a is 0.20 to 0.52, b is 0.10 to 0.20, c is 0.30 to 0.55, and d is 0 to 0.30; the solid electrolyte layer includes a portion A in contact with the negative electrode layer and a portion B in contact with the positive electrode layer; and d in the portion A is larger than d in the portion B.

2. The battery structure according to claim 1, wherein d is in a range of 0.03 to 0.30 in the portion A and in a range of 0 to 0.25 in the portion B.

3. The battery structure according to claim 1, wherein d has a functional gradient in each of the portions A and B and/or between the portions.

4. A battery structure comprising a positive electrode layer, a solid electrolyte layer, and a negative electrode layer disposed in that order, wherein the solid electrolyte layer has a chemical composition, excluding incidental impurities, represented by the formula $aLi \cdot bX \cdot cS \cdot dY$, where X is at least one element of phosphorus (P) and boron (B), Y is at least one element of oxygen (O) and nitrogen (N), the sum of a, b, c, and d is 1, a is 0.20 to 0.52, b is 0.10 to 0.20, c is 0.30 to 0.55, and d is 0 to 0.30; the solid electrolyte layer includes a portion A in contact with the negative electrode layer, a portion B in contact with the positive electrode layer, and a portion C that is not in contact with either of the positive and negative electrodes; and d in each of the portion A and the portion B is larger than d in the portion C.

5. The battery structure according to claim 4, wherein d in the portion A is larger than d in the portion B.

6. The battery structure according to claim 5, wherein d is in a range of 0.03 to 0.30 in the portion A and in a range of 0 to 0.25 in the portion B.

7. The battery structure according to claim 4, wherein d has a functional gradient in each of the portions A, B, and C and/or between the portions.

8. A lithium secondary battery comprising the battery structure according to claim 1.

9. The battery structure according to claim 2, wherein d has a functional gradient in each of the portions A and B and/or between the portions.

10. The battery structure according to claim 5, wherein d has a functional gradient in each of the portions A, B, and C and/or between the portions.

11. The battery structure according to claim 6, wherein d has a functional gradient in each of the portions A, B, and C and/or between the portions.

12. A lithium secondary battery comprising the battery structure according to claim 4.

* * * * *